US012328072B2

(12) United States Patent
Hsu et al.

(10) Patent No.: US 12,328,072 B2
(45) Date of Patent: Jun. 10, 2025

(54) POWER CONVERTER WITH ADAPTIVELY ADJUSTABLE VOLTAGES BASED ON DETECTED CURRENTS

(71) Applicant: ANPEC ELECTRONICS CORPORATION, Hsinchu (TW)

(72) Inventors: Chun-Kai Hsu, Hsinchu (TW); Chih-Heng Su, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 270 days.

(21) Appl. No.: 18/304,354

(22) Filed: Apr. 21, 2023

(65) Prior Publication Data

US 2024/0283361 A1   Aug. 22, 2024

(30) Foreign Application Priority Data

Feb. 17, 2023   (TW) .................................. 112105659

(51) Int. Cl.
*H02M 3/158*   (2006.01)
*H02M 1/00*   (2006.01)
*H05B 45/375*   (2020.01)

(52) U.S. Cl.
CPC ......... *H02M 3/158* (2013.01); *H02M 1/0009* (2021.05); *H02M 1/0025* (2021.05); *H05B 45/375* (2020.01)

(58) Field of Classification Search
CPC ..... H05B 45/375; H05B 45/37; H02M 3/158; H02M 1/0009; H02M 1/0025
See application file for complete search history.

(56) References Cited

U.S. PATENT DOCUMENTS

| 8,536,806 B2 | 9/2013 | Kitagawa et al. |
| 2014/0292220 A1* | 10/2014 | Trattler ................. H05B 45/46 |
| | | 323/283 |
| 2019/0110349 A1* | 4/2019 | Tsukahara .......... G03B 21/2053 |

* cited by examiner

*Primary Examiner* — Alex Torres-Rivera
(74) *Attorney, Agent, or Firm* — Li & Cai Intellectual Property Office (57) ABSTRACT

A power converter with adaptively adjustable voltages based on detected currents is provided. A current detector circuit detects values of currents flowing through a plurality of switch components multiple times. Each time when all of the detected values of the currents flowing through the plurality of switch components are normal current values, a counter counts down a reference voltage to decrease the reference voltage. When the detected value of the current flowing through any one of the plurality of switch components is an abnormal current value, the counter counts up the reference voltage to increase the reference voltage. A controller circuit controls a high-side switch and a low-side switch to operate according to the reference voltage received from the counter each time.

14 Claims, 5 Drawing Sheets

POWER CONVERTER WITH ADAPTIVELY ADJUSTABLE VOLTAGES BASED ON DETECTED CURRENTS

CROSS-REFERENCE TO RELATED PATENT APPLICATION

This application claims the benefit of priority to Taiwan Patent Application No. 112105659, filed on Feb. 17, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter with adaptively adjustable voltages based on detected currents.

BACKGROUND OF THE DISCLOSURE

Power converters are indispensable for electronic devices, and are used to adjust power and supply the adjusted power to the electronic devices. High-side switches and low-side switches of the power converters need to be switched according to voltages, currents or other data of circuit components of the power converters, such that the power converter supplies appropriate power to loads. However, conventional controller circuits of the power converters are not capable of effectively controlling the high-side switches and the low-side switches of the power converters, which causes the power converters to have high power consumption.

SUMMARY OF THE DISCLOSURE

In response to the above-referenced technical inadequacies, the present disclosure provides a power converter with adaptively adjustable voltages based on detected currents. The power converter includes a high-side switch, a low-side switch, a controller circuit, a plurality of switch components, a current detector circuit and a counter. A first terminal of the high-side switch is coupled to an input voltage. A first terminal of the low-side switch is connected to a second terminal of the high-side switch. A second terminal of the low-side switch is grounded. A node between the first terminal of the low-side switch and the second terminal of the high-side switch is connected to a first terminal of an inductor. The controller circuit is connected to a control terminal of the high-side switch and a control terminal of the low-side switch. A first terminal of each of the plurality of switch components is connected to a second terminal of the inductor. Second terminals of the plurality of switch components are connected to first terminals of a plurality of electronic components respectively. A second terminal of each of the plurality of electronic components is grounded. The current detector circuit is connected to the second terminal of each of the plurality of switch components. The current detector circuit is configured to detect a value of a current flowing through each of the plurality of switch components multiple times. The counter is connected to the current detector circuit and the controller circuit. The counter is configured to count down a preset maximum reference voltage to decrease the preset maximum reference voltage to form a reference voltage. Each time when the current detector circuit determines that the value of the current flowing through each of the plurality of switch components is a normal current value, the counter counts down the reference voltage to decrease the reference voltage and outputs the reference voltage that is decreased to the controller circuit. When the controller circuit controls the high-side switch and the low-side switch to operate according to the reference voltage such that the value of the current flowing through any one of the plurality of switch components is an abnormal current value, the counter counts up the reference voltage to increase the reference voltage and outputs the reference voltage that is increased to the controller circuit. The controller circuit controls the high-side switch and the low-side switch to operate according to the reference voltage received from the counter each time.

In certain embodiments, the second terminal of the inductor is connected to a first terminal of a capacitor, and a second terminal of the capacitor is grounded.

In certain embodiments, the counter includes a down counter circuit and an up counter circuit. The down counter circuit is connected to the current detector circuit. The down counter circuit is configured to count down the preset maximum reference voltage and the reference voltage. The up counter circuit is connected to the down counter circuit and the controller circuit. The up counter circuit is configured to count up the reference voltage.

In certain embodiments, when the current detector circuit determines that the current flowing through each of the plurality of switch components is not smaller than an initial current of each of the plurality of switch components and the preset maximum reference voltage is not counted down yet, the counter counts down the preset maximum reference voltage.

In certain embodiments, each time when the current detector circuit determines that the current flowing through each of the plurality of switch components is not smaller than the initial current of each of the plurality of switch components yet and the preset maximum reference voltage is counted down to form the reference voltage, the counter counts down the reference voltage.

In certain embodiments, each time when the current detector circuit determines that the current flowing through any one of the plurality of switch components is decreased to be smaller than the initial current of the one of the plurality of switch components, the counter counts up the reference voltage instead of counting down the reference voltage.

In certain embodiments, each time when the current detector circuit determines that the current flowing through any one of the plurality of switch components is decreased to be smaller than the initial current of the one of the plurality of switch components, and a difference between the current flowing through the one of the plurality of switch components and the initial current of the one of the plurality of switch components is larger than a current difference threshold, the counter counts up the reference voltage instead of counting down the reference voltage.

In certain embodiments, each time when the current detector circuit determines that a ratio of the current currently flowing through each of the plurality of switch components with respect to the current initially flowing through each of the plurality of switch components is smaller than a reference ratio, and the preset maximum reference voltage is not counted down yet, the counter counts down the preset maximum reference voltage.

In certain embodiments, each time when the current detector circuit determines that the ratio of the current currently flowing through each of the plurality of switch components with respect to the current initially flowing through each of the plurality of switch components is smaller than the reference ratio, and the preset maximum reference voltage is counted down to form the reference voltage, the counter counts down the reference voltage.

In certain embodiments, when the current detector circuit determines that the ratio of the current currently flowing through each of the plurality of switch components with respect to the current initially flowing through each of the plurality of switch components is larger than the reference ratio, the counter counts up the reference voltage instead of counting down the reference voltage.

In certain embodiments, when the counter determines that all of the plurality of the switch components operate in a saturation region according to the value of the current flowing through each of the switch components from the current detector circuit, the counter counts down the reference voltage.

In certain embodiments, when the counter determines that any one of the plurality of the switch components operates in a linear region according to the value of the current flowing through the one of the switch components from the current detector circuit, the counter counts up the reference voltage.

In certain embodiments, each time when the counter counts down the reference voltage, the counter counts down the reference voltage N times to subtract N preset modulation voltages from the reference voltage, wherein N is a positive integer value. Each time when the counter counts up the reference voltage, the counter counts up the reference voltage M times to add up M preset modulation voltages with the reference voltage, wherein M is a positive integer value.

In certain embodiments, the plurality of electronic components controlled by the power converter include a plurality of light-emitting components.

As described above, the present disclosure provides the power converter with the adaptively adjustable voltages based on the detected currents. The current detector circuit of the power converter of the present disclosure detects the values of the currents flowing through the plurality of switch components (such as, but not limited to, the plurality of light-emitting components) connected to the plurality of electronic components. The controller circuit of the power converter of the present disclosure adjusts the reference voltage for controlling the high-side switch and the low-side switch according to the values of the currents detected multiple times. As a result, the currents flowing through the plurality of electronic components are adjusted multiple times. The controller circuit of the power converter of the present disclosure continually controls the high-side switch and the low-side switch to operate according to the final reference voltage having the appropriate voltage value. Therefore, the plurality of switch components of the power converter of the present disclosure are controlled such that the plurality of electronic components operate as expected, under the condition of low power consumption of the power converter of the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
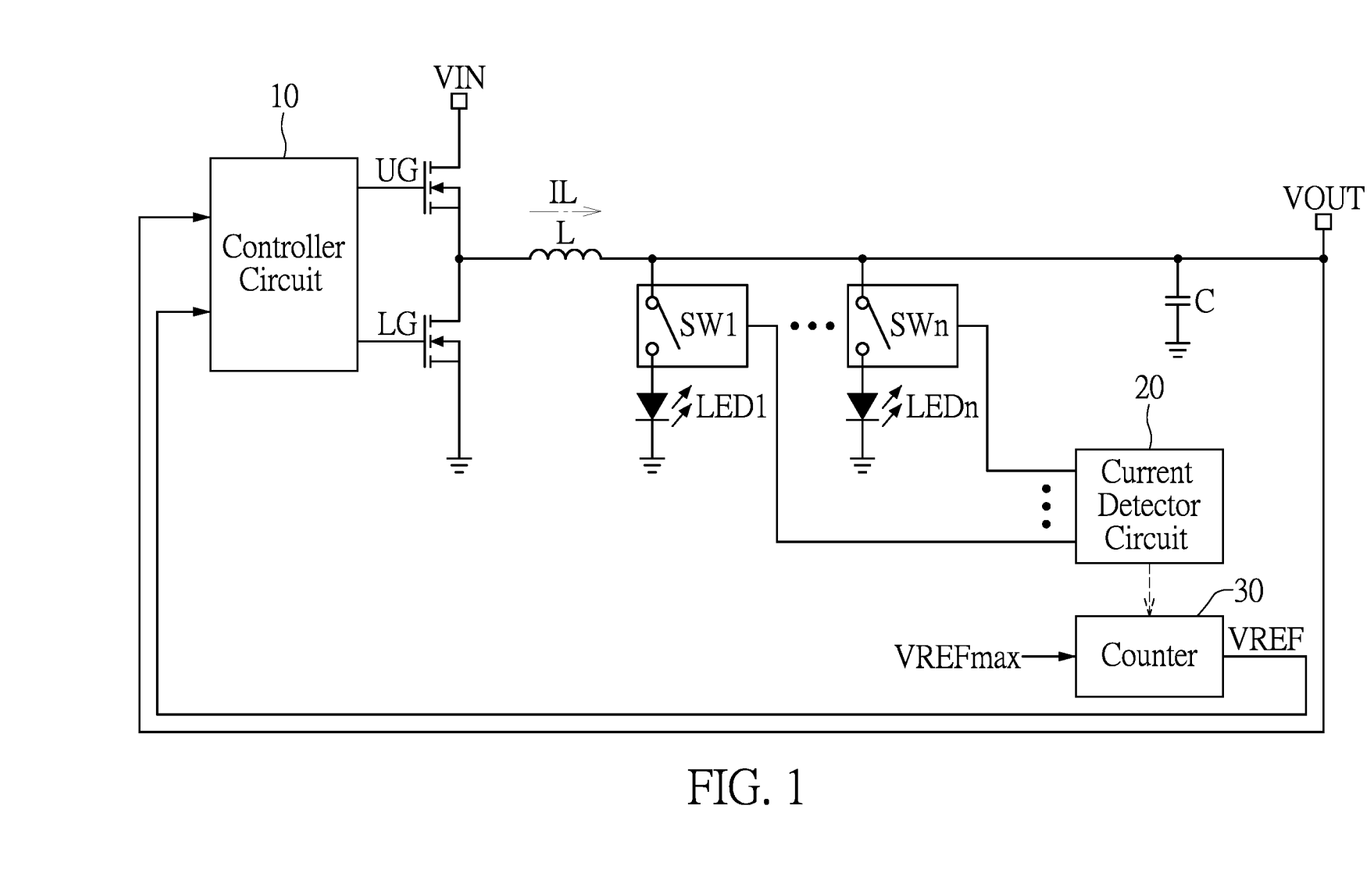
FIG. 1 is a circuit diagram of a power converter with adaptively adjustable voltages based on detected currents according to a first embodiment of the present disclosure.
Figure 3:
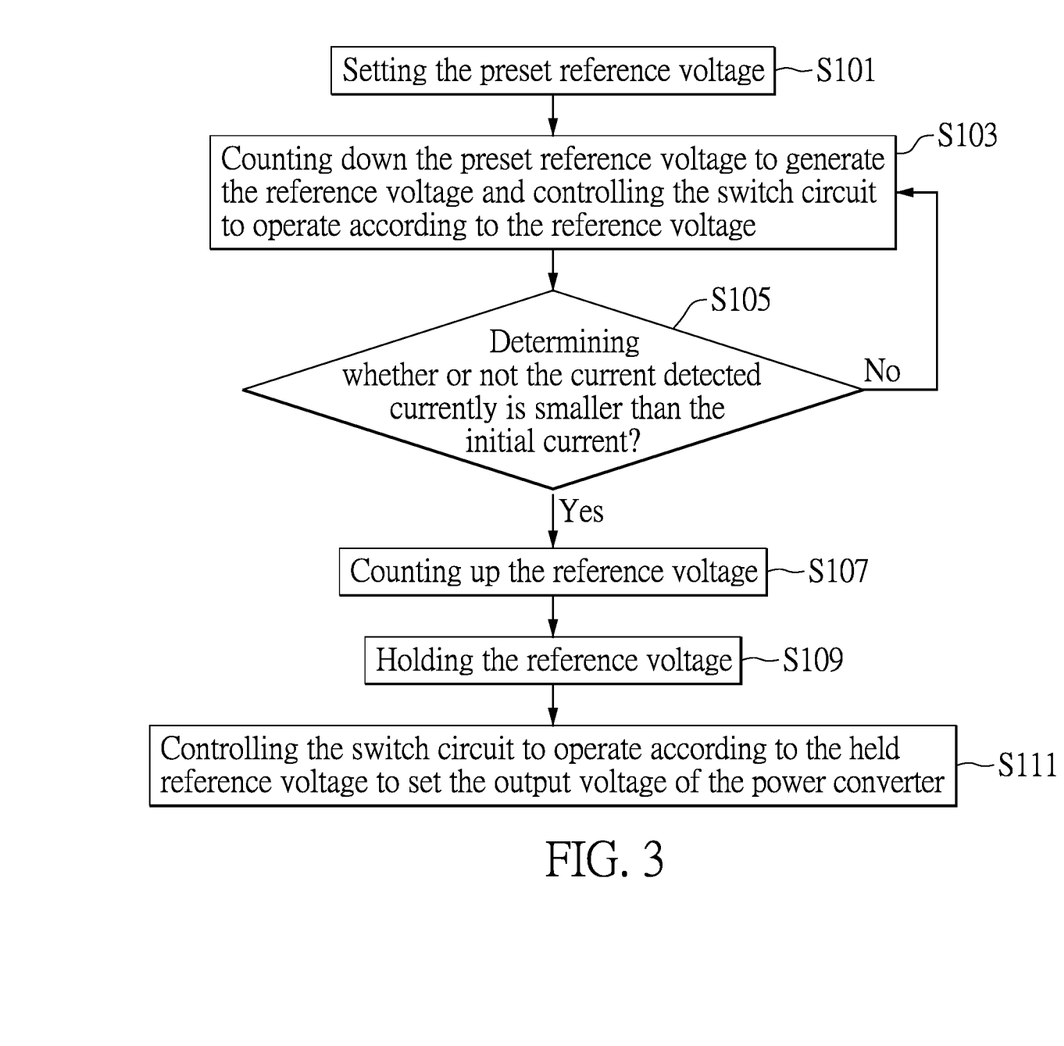
FIG. 3 is a flowchart diagram of the power converter with the adaptively adjustable voltages based on the detected currents according to the first and second embodiments of the present disclosure.

Reference is made to FIGS. 1 and 3, in which FIG. 1 is a circuit diagram of a power converter with adaptively adjustable voltages based on detected currents according to a first embodiment of the present disclosure, and FIG. 3 is a flowchart diagram of the power converter with the adaptively adjustable voltages based on the detected currents according to the first and second embodiments of the present disclosure.

The power converter of the first embodiment of the present disclosure controls a plurality of electronic components such as, but not limited to a plurality of light-emitting components LED1 to LEDn as shown in FIG. 1, to operate as expected, under the condition of low power consumption of the power converter (in steps S101 to S111 as shown in FIG. 3).

As shown in FIG. 1, the power converter of the first embodiment of the present disclosure includes a high-side switch UG, a low-side switch LG, a controller circuit 10, a current detector circuit 20, a counter 30, and a plurality of switch components SW1 to SWn.

A first terminal of the high-side switch UG is coupled to an input voltage Vin. A first terminal of the low-side switch LG is connected to a second terminal of the high-side switch UG. A second terminal of the low-side switch LG is grounded. A node between the first terminal of the low-side switch LG and the second terminal of the high-side switch UG is connected to a first terminal of an inductor L. A second terminal of the inductor L is connected to a first terminal of a capacitor C. A second terminal of the capacitor C is grounded.

A node between the second terminal of the inductor L and the first terminal of the capacitor C is an output terminal of the power converter. A voltage at the node between the second terminal of the inductor L and the first terminal of the capacitor C is an output voltage VOUT of the power converter.

A first terminal of each of the plurality of switch components SW1 to SWn is connected to the second terminal of the inductor L. Second terminals of the plurality of switch components SW1 to SWn are connected to first terminals of the plurality of light-emitting components LED1 to LEDn respectively. A second terminal of each of the plurality of light-emitting components LED1 to LEDn is grounded. In practice, each of the plurality of switch components SW1 to SWn shown in FIG. 1 may be replaced with transistors or other types of switch components, but the present disclosure is not limited thereto.

The current detector circuit 20 is connected to the second terminal (or the first terminal) of each of the plurality of switch components SW1 to SWn. The counter 30 is connected to the current detector circuit 20 and the controller circuit 10. The controller circuit 10 is connected to a control terminal of the high-side switch UG and a control terminal of the low-side switch LG.

The counter 30 may set a preset maximum reference voltage VREFmax or receive the preset maximum reference voltage VREFmax from an external circuit as shown in FIG. 1 (in step S101).

The controller circuit 10 initially controls the high-side switch UG and the low-side switch LG to normally operate such that an inductor current IL flows through the inductor L, (according to the preset maximum reference voltage VREFmax). Then, the inductor current IL is divided into a plurality of output currents. The plurality of output currents flow through the plurality of switch components SW1 to SWn being turned on to the plurality of light-emitting components LED1 to LEDn, respectively. As a result, the plurality of switch components SW1 to SWn are controlled to operate such that the plurality of light-emitting components LED1 to LEDn emit light as expected.

The current detector circuit 20 detects a current flowing through each of the plurality of switch components SW1 to SWn. When the controller circuit 10 initially controls the high-side switch UG and the low-side switch LG to normally operate, the current detector circuit 20 determines that a value of the current flowing through each of the plurality of switch components SW1 to SWn is a normal current value.

It is worth noting that, when the current detector circuit 20 determines that the value of the current flowing through each of the plurality of switch components SW1 to SWn is the normal current value, the counter 30 counts down the preset maximum reference voltage VREFmax to decrease the preset maximum reference voltage VREFmax to form the reference voltage VREF (in step S103). Then, the counter 30 provides the reference voltage VREF to the controller circuit 10 (in step S103). The reference voltage VREF generated by the counter 30 is lower than the preset maximum reference voltage VREFmax.

When the controller circuit 10 receives the reference voltage VREF from the counter 30, the controller circuit 10 controls the high-side switch UG and the low-side switch LG to operate according to the reference voltage VREF instead of the preset maximum reference voltage VREFmax.

For example, the current detector circuit 20 may compare the currents flowing through the plurality of switch components SW1 to SWn that are detected each time with initial currents of the plurality of switch components SW1 to SWn respectively to determine whether or not the counter 30 counts down the preset maximum reference voltage VREFmax.

As described herein, the initial currents of the plurality of switch components SW1 to SWn may be the plurality of output currents divided from the inductor current IL that is generated when the high-side switch UG and the low-side switch LG are initially controlled to normally operate (according to the preset maximum reference voltage VREFmax) by the controller circuit 10.

In detail, when the current detector circuit 20 determines that the detected current flowing through each of the plurality of switch components SW1 to SWn is not smaller than the initial current of each of the plurality of switch components SW1 to SWn and the preset maximum reference voltage VREFmax is not counted down yet (in step S105), the counter 30 counts down the preset maximum reference voltage VREFmax to decrease the preset maximum reference voltage VREFmax to form a reference voltage VREF. The reference voltage VREF is lower than the preset maximum reference voltage VREFmax.

Alternatively, each time when the current detector circuit 20 determines that a ratio of the current currently flowing through each of the plurality of switch components SW1 to SWn with respect to the current initially flowing through each of the plurality of switch components SW1 to SWn is smaller than a reference ratio, and the preset maximum reference voltage VREFmax is not counted down yet, the counter 30 counts down the preset maximum reference voltage VREFmax to decrease the preset maximum reference voltage VREFmax to form the reference voltage VREF.

It should be understood that, the controller circuit 10 controls the high-side switch UG and the low-side switch LG according to the reference voltage VREF, the values of the currents flowing through one or more of the plurality of switch components SW1 to SWn may be abnormal current values, or the values of the currents flowing through all of the plurality of switch components SW1 to SWn may be normal current values.

Therefore, the controller circuit 10 controls the high-side switch UG and the low-side switch LG to operate according to the reference voltage VREF from the counter 30 multiple times. The current detector circuit 20 detects the current flowing through each of the plurality of switch components SW1 to SWn multiple times.

Each time when the current detector circuit 20 determines that the detected current flowing through each of the plurality of switch components SW1 to SW is the normal current value and the preset maximum reference voltage VREFmax is counted down to form the reference voltage VREF, the counter 30 counts down the reference voltage VREF to decrease the reference voltage VREF (returning to step S103). Then, the counter 30 outputs the reference voltage VREF that is counted down to the controller circuit 10.

For example, each time when the current detector circuit 20 determines that the detected current flowing through each of the plurality of switch components SW1 to SW is not smaller than the initial current of each of the plurality of switch components SW1 to SWn yet, and the preset maximum reference voltage VREFmax is previously counted down to form the reference voltage VREF, the counter 30 counts down the reference voltage VREF to decrease the reference voltage VREF.

Alternatively, when the current detector circuit 20 determines that the ratio of the current currently flowing through each of the plurality of switch components SW1 to SWn with respect to the current initially flowing through each of the plurality of switch components SW1 to SWn is smaller than the reference ratio, and the preset maximum reference voltage VREFmax is previously counted down to form the reference voltage VREF, the counter 30 counts down the reference voltage VREF to decrease the reference voltage VREF.

For example, when the counter 30 determines that all of the plurality of the switch components SW1 to SWn operate in a saturation region according to the value of the current flowing through each of the switch components SW1 to SWn from the current detector circuit 20, the counter counts down the reference voltage VREF to decrease the reference voltage VREF.

Each time when the counter 30 outputs the decreased reference voltage VREF to the controller circuit 10, the controller circuit 10 controls the high-side switch UG and the low-side switch LG to operate according to the decreased reference voltage VREF.

When the current detector circuit 20 determines that the current flowing through each of the plurality of switch components SW1 to SWn has the normal current value multiple times, the counter 30 counts down the reference voltage VREF multiple times to decrease the reference voltage VREF multiple times.

The controller circuit 10 controls the high-side switch UG and the low-side switch LG to operate according to the reference voltage VREF received from the counter 30 multiple times to adjust the value of the inductor current IL multiple times. As a result, the values of the plurality of output currents divided from the inductor current IL are adjusted multiple times. The plurality of output currents adjusted each time flow through the plurality of light-emitting components LED1 to LEDn respectively.

However, when the controller circuit 10 controls the high-side switch UG and the low-side switch LG to operate according to the reference voltage VREF such that the current detector circuit 20 detects the abnormal current value of the current flowing through any one of the plurality of switch components SW1 to SWn, the counter 30 does not further count down the reference voltage VREF. At this time, the counter 30 counts up the reference voltage VREF to increase the reference voltage VREF.

For example, each time when the current detector circuit 20 determines that the current flowing through any one of the plurality of switch components SW1 to SWn is decreased to be smaller than the initial current of the one of the plurality of switch components SW1 to SWn (and a difference between the detected current and the initial current is larger than a current difference threshold) (in step S105), the counter 30 does not further count down the reference voltage VREF. At this time, the counter 30 counts up the reference voltage VREF to increase the reference voltage VREF (in step S107).

Alternatively, when the current detector circuit 20 determines that the ratio of the current currently flowing through each of the plurality of switch components SW1 to SWn with respect to the current initially flowing through each of the plurality of switch components SW1 to SWn is larger than the reference ratio, the counter 30 does not further count down the reference voltage VREF. At this time, the counter 30 counts up the reference voltage VREF to increase the reference voltage VREF.

For example, when the counter 30 determines that all of the plurality of the switch components SW1 to SWn operate in a linear region according to the value of the current flowing through each of the switch components SW1 to SWn from the current detector circuit 20, the counter 30 counts up the reference voltage VREF to increase the reference voltage VREF.

Each time when the counter 30 counts down the reference voltage VREF as described herein, the counter 30 counts down the reference voltage VREF N times to subtract N (first) preset modulation voltages from the reference voltage VREF, wherein N is a positive integer value. Each time when the counter 30 counts up the reference voltage VREF as described herein, the counter 30 counts up the reference voltage VREF M times to add up M (second) preset modulation voltages with the reference voltage VREF, wherein M is a positive integer value. For example, the N is equal to 1 and the M is larger than 1, but the present disclosure is not limited thereto. In practice, the N and the M may be equal to 1 or other values.

The controller circuit 10 finally, according to the reference voltage VREF that is counted up (and the output voltage VOUT of the power converter) (in step S109), controls the high-side switch UG and the low-side switch LG to operate such that the output voltage VOUT of the power converter and the inductor current IL reach appropriate values (in step S111). The plurality of output currents are divided from the inductor current IL of the power converter of the present disclosure, and then flow to the plurality of switch components SW1 to SWn such that the plurality of switch components SW1 to SWn operate as expected. As a result, the plurality of light-emitting components LED1 to LEDn emit light as expected.

That is, in the power converter of the present disclosure, the plurality of switch components SW1 to SWn are controlled such that the plurality of light-emitting components LED1 to LEDn emit light as expected. At the same time, a voltage difference between the output voltage VOUT of the power converter of the present disclosure and a voltage of each of the plurality of light-emitting components LED1 to LEDn can be maintained at a minimum voltage value. Therefore, power consumption of the plurality of switch components SW1 to SWn can be reduced such that overall power loss of the power converter of the present disclosure is minimized.

Figure 2:
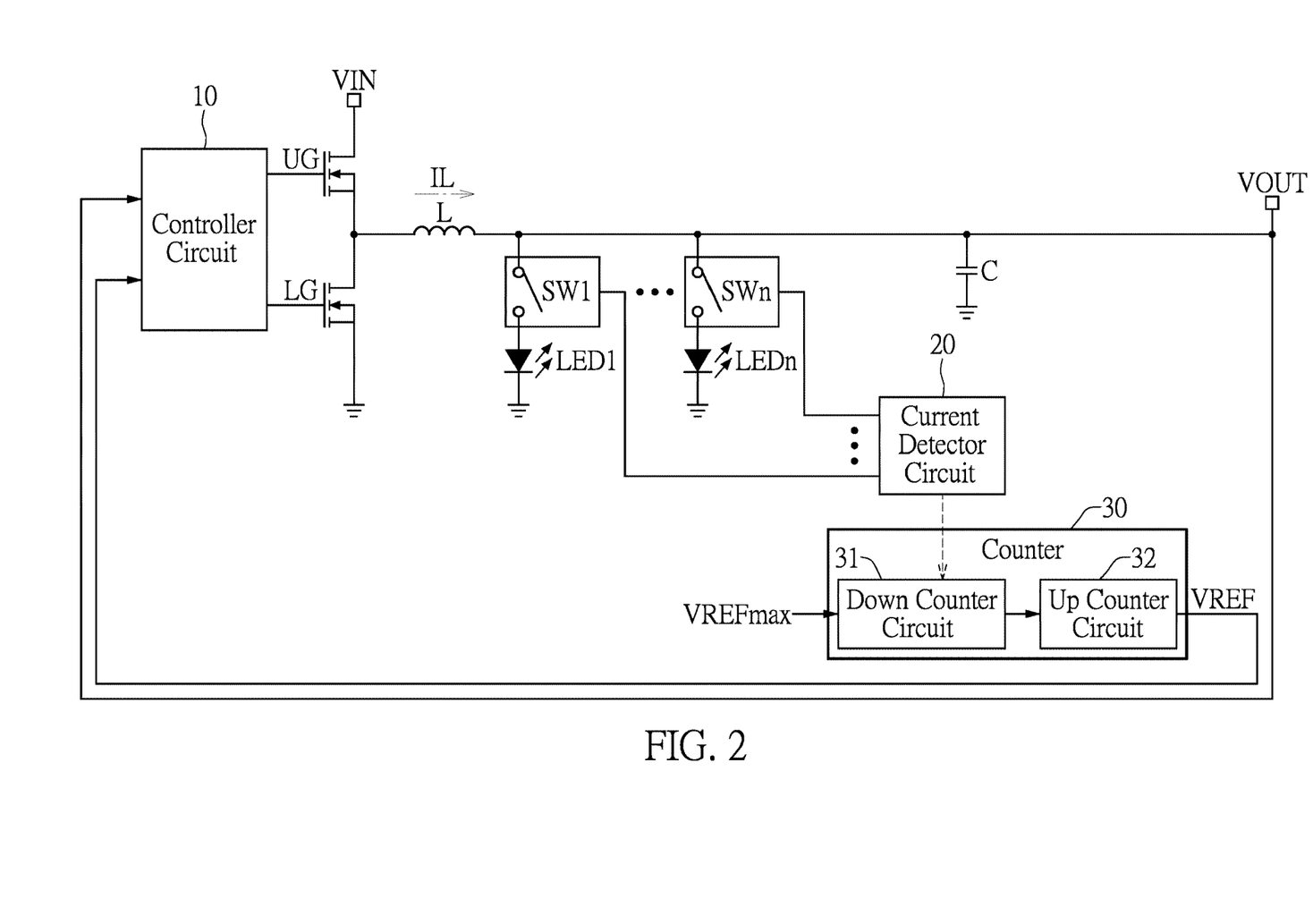
FIG. 2 is a circuit diagram of a power converter with adaptively adjustable voltages based on detected currents according to a second embodiment of the present disclosure.

Reference is made to FIGS. 2 and 3, in which FIG. 2 is a circuit diagram of a power converter with adaptively adjustable voltages based on detected currents according to a second embodiment of the present disclosure, and FIG. 3 is a flowchart diagram of the power converter with the adaptively adjustable voltages based on the detected currents according to the first and second embodiments of the present disclosure.

The second embodiment of the power converter of the present disclosure controls the plurality of electronic components such as, but not limited to, the plurality of light-emitting components LED1 to LEDn as shown in FIG. 2 to operate as expected (in step S101 to S111 as shown in FIG. 3), under the condition of lowest power consumption in the power converter.

As shown in FIG. 2, the power converter of the second embodiment of the present disclosure includes the high-side switch UG, the low-side switch LG, the controller circuit 10, the current detector circuit 20, the counter 30, and the plurality of switch components SW1 to SWn. The same descriptions of the first and second embodiments of the present disclosure are not repeated herein.

A difference between the first and second embodiments of the present disclosure is that, the counter 30 of the power converter of the second embodiment includes a down counter circuit 31 and an up counter circuit 32 as shown in FIG. 2.

The down counter circuit 31 is connected to the current detector circuit 20. The up counter circuit 32 is connected to the down counter circuit 31 and the controller circuit 10.

The down counter circuit 31 of the second embodiment of the present disclosure is configured to count down the preset maximum reference voltage VREFmax and count down the reference voltage VREF, as the related descriptions of the counter 30 in the first embodiment.

The up counter circuit 32 of the second embodiment of the present disclosure is configured to count up the reference voltage VREF, as the related descriptions of the counter 30 in the first embodiment.

In practice, the down counter circuit 31 of the power converter of the present disclosure may be directly connected to the controller circuit 10. The preset maximum reference voltage VREFmax and the reference voltage VREF that are counted down each time may be directly outputted from the down counter circuit 31 to the controller circuit 10 without being transmitted through the up counter circuit 32.

Figure 4:
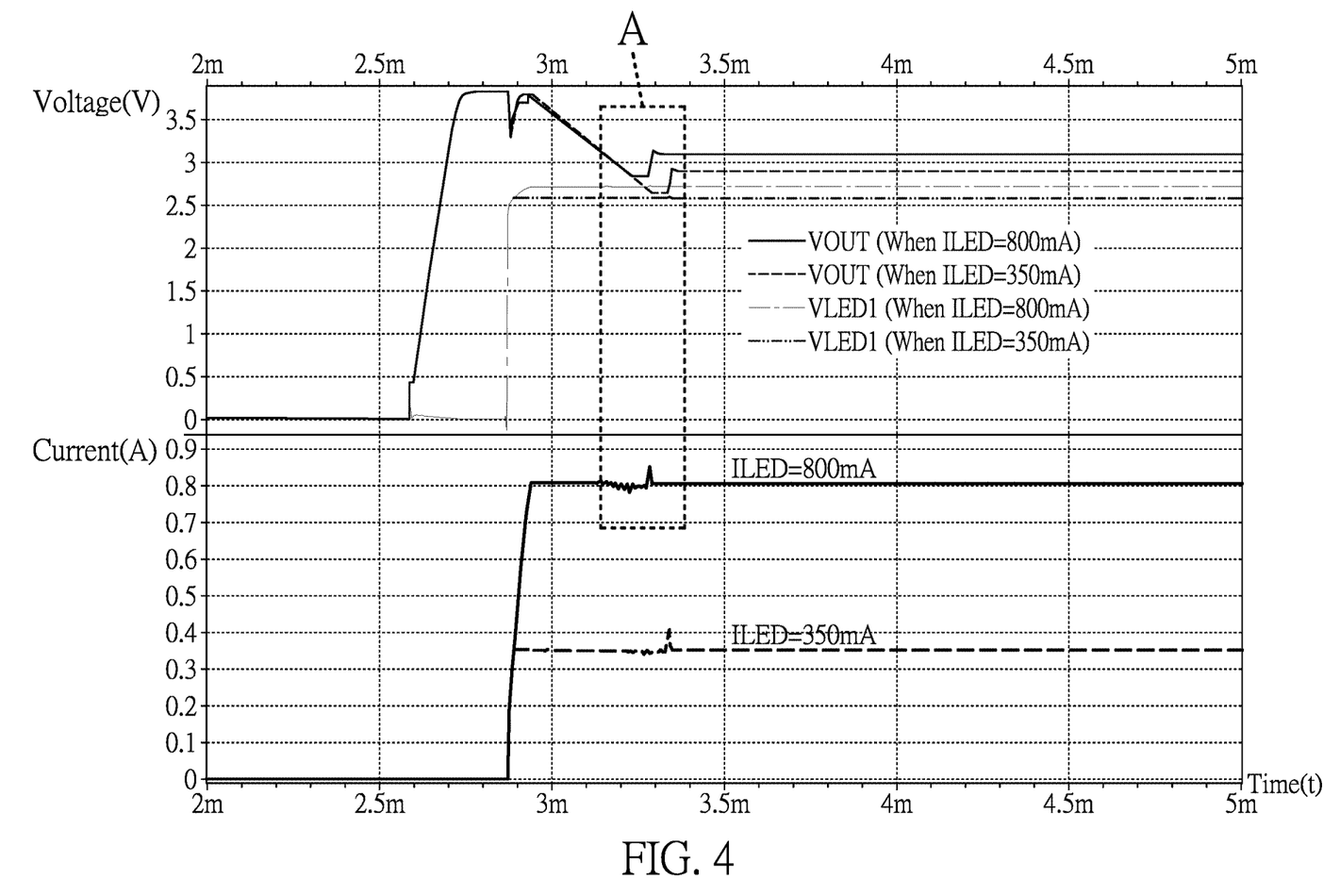
FIG. 4 is a waveform diagram of signals of the power converter with the adaptively adjustable voltages based on the detected currents according to the first and second embodiments of the present disclosure.
Figure 5:
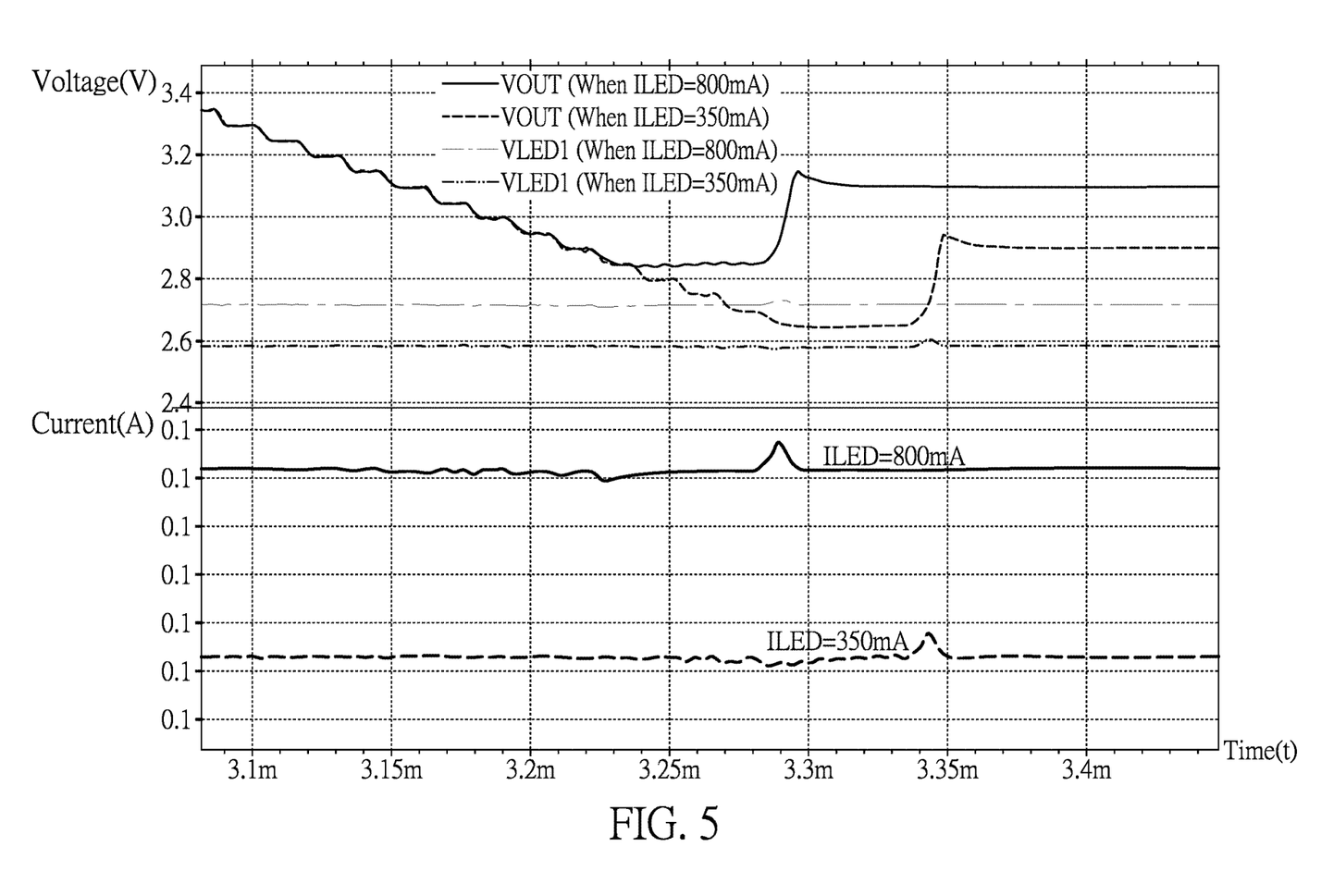
FIG. 5 is a waveform diagram of a part of the signal that is illustrated as a dotted line A in FIG. 4.

Reference is made to FIGS. 1 to 5, in which FIG. 4 is a waveform diagram of signals of the power converter with the adaptively adjustable voltages based on the detected currents according to the first and second embodiments of the present disclosure, and FIG. 5 is a waveform diagram of a part of the signal that is shown in a dotted line A of FIG. 4.

The (down counter circuit 31 of the) counter 30 of the power converter of the present disclosure counts down the preset maximum reference voltage VREFmax to decrease the preset maximum reference voltage VREFmax to form the reference voltage VREF, and then counts down the reference voltage VRER multiple times to decrease the reference voltage VRER multiple times.

The controller circuit 10 of the power converter of the present disclosure controls the high-side switch UG and the low-side switch LG to operate according to the reference voltage VREF counted each time by the counter 30. Therefore, each time when the counter 30 counts down the reference voltage VREF to decrease the reference voltage VREF, the output voltage VOUT of the power converter of the present disclosure is decreased.

The counter 30 of the power converter of the present disclosure counts down the reference voltage VREF multiple times to decrease the reference voltage VREF multiple times such that the output voltage VOUT of the power converter of the present disclosure is continually decreased. As a result, falling waveform segments of waveforms of signals of the output voltage VOUT of the power converter of the present disclosure are generated as shown in FIGS. 4 and 5.

When the controller circuit 10 controls the high-side switch UG and the low-side switch LG to operate according to the reference voltage VREF counted down by the counter 30 such that the plurality of switch components SW1 to SWn do not operate as expected (for example, the plurality of switch components SW1 to SWn operate in the linear region), the counter 30 does not further count down the reference voltage VREF. At this time, the counter 30 counts up the reference voltage VREF that is previously counted down to increase the reference voltage VREF.

When the controller circuit 10 controls the high-side switch UG and the low-side switch LG to operate according to the reference voltage VREF that is counted up, the voltage VOUT of the power converter of the present disclosure is maintained at the appropriate value. As a result, rising waveform segments of the waveforms of the signals of the output voltage VOUT of the power converter of the present disclosure are generated as shown in FIGS. 4 and 5.

Finally, the controller circuit 10 continually controls the high-side switch UG and the low-side switch LG to operate according to the reference voltage VREF that is counted up. As a result, the voltage VOUT of the power converter of the present disclosure is maintained at the appropriate value. After the rising waveform segments of the waveforms of the signals of the output voltage VOUT are generated, stable and smooth waveform segments of the waveforms of the signals of the output voltage VOUT of the power converter of the present disclosure are generated as shown in FIGS. 4 and 5.

No matter what current value of a current ILED for controlling each of the plurality of light-emitting components LED1 to LEDn to emit light by the power converter of the present disclosure (such as, but not limited to 800 mA or 350 mA as shown in FIGS. 4 and 5), a voltage difference between the output voltage VOUT of the power converter and a voltage of each of the plurality of light-emitting components LED1 to LEDn (that includes a voltage VLED of the light-emitting component LED1) is maintained at a small voltage value. Under the condition, the voltage difference can be adjusted to be an optimal voltage difference such that the power converter of the present disclosure has an optimal operating efficiency.

The plurality of switch components SW1 to SWn of the power converter of the present disclosure are controlled to operate as expected, under the condition that the power consumption of the plurality of switch components SW1 to SWn are effectively reduced. Therefore, the power consumption of the power converter of the present disclosure is effectively reduced.

In summary, the present disclosure provides the power converter with the adaptively adjustable voltages based on the detected currents. The current detector circuit of the power converter of the present disclosure detects the values of the currents flowing through the plurality of switch components (such as, but not limited to, the plurality of light-emitting components) connected to the plurality of electronic components. The controller circuit of the power converter of the present disclosure adjusts the reference voltage for controlling the high-side switch and the low-side switch according to the values of the currents detected multiple times. As a result, the currents flowing through the plurality of electronic components are adjusted multiple times. The controller circuit of the power converter of the present disclosure continually controls the high-side switch and the low-side switch to operate according to the final reference voltage having the appropriate voltage value. Therefore, the plurality of switch components of the power converter of the present disclosure are controlled such that the plurality of electronic components operate as expected, under the condition of low power consumption of the power converter of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter with adaptively adjustable voltages based on detected currents, comprising:
   a high-side switch, a first terminal of the high-side switch being coupled to an input voltage;
   a low-side switch, wherein a first terminal of the low-side switch is connected to a second terminal of the high-side switch, a second terminal of the low-side switch is grounded, and a node between the first terminal of the low-side switch and the second terminal of the high-side switch is connected to a first terminal of an inductor;
   a controller circuit connected to a control terminal of the high-side switch and a control terminal of the low-side switch;
   a plurality of switch components, wherein a first terminal of each of the plurality of switch components is connected to a second terminal of the inductor, second terminals of the plurality of switch components are connected to first terminals of a plurality of electronic components respectively, and a second terminal of each of the plurality of electronic components is grounded;
   a current detector circuit connected to the second terminal of each of the plurality of switch components, and configured to detect, for multiple times, a value of a current flowing through each of the plurality of switch components; and
   a counter connected to the current detector circuit and the controller circuit, and configured to count down a preset maximum reference voltage to decrease the preset maximum reference voltage to form a reference voltage;
   wherein, each time when the current detector circuit determines that the value of the current flowing through each of the plurality of switch components is a normal current value, the counter counts down the reference voltage to decrease the reference voltage and outputs the reference voltage that is decreased to the controller circuit;
   wherein, when the controller circuit controls the high-side switch and the low-side switch to operate according to the reference voltage such that the value of the current flowing through any one of the plurality of switch components is an abnormal current value, the counter counts up the reference voltage to increase the reference voltage and outputs the reference voltage that is increased to the controller circuit;
   wherein the controller circuit controls the high-side switch and the low-side switch to operate according to the reference voltage received each time from the counter.

2. The power converter according to claim 1, wherein the second terminal of the inductor is connected to a first terminal of a capacitor, and a second terminal of the capacitor is grounded.

3. The power converter according to claim 1, wherein the counter includes:
   a down counter circuit connected to the current detector circuit, and configured to count down the preset maximum reference voltage and the reference voltage; and
   an up counter circuit connected to the down counter circuit and the controller circuit, and configured to count up the reference voltage.

4. The power converter according to claim 1, wherein, when the current detector circuit determines that the current flowing through each of the plurality of switch components is not smaller than an initial current of each of the plurality of switch components and the preset maximum reference voltage is not counted down yet, the counter counts down the preset maximum reference voltage.

5. The power converter according to claim 4, wherein, each time when the current detector circuit determines that the current flowing through each of the plurality of switch components is not smaller than the initial current of each of the plurality of switch components yet and the preset maximum reference voltage is counted down to form the reference voltage, the counter counts down the reference voltage.

6. The power converter according to claim 5, wherein, each time when the current detector circuit determines that the current flowing through any one of the plurality of switch components is decreased to be smaller than the initial current of the one of the plurality of switch components, the counter counts up the reference voltage instead of counting down the reference voltage.

7. The power converter according to claim 5, wherein, each time when the current detector circuit determines that the current flowing through any one of the plurality of switch components is decreased to be smaller than the initial current of the one of the plurality of switch components, and a difference between the current flowing through the one of the plurality of switch components and the initial current of the one of the plurality of switch components is larger than a current difference threshold, the counter counts up the reference voltage instead of counting down the reference voltage.

8. The power converter according to claim 1, wherein, each time when the current detector circuit determines that a ratio of the current currently flowing through each of the plurality of switch components with respect to the current initially flowing through each of the plurality of switch components is smaller than a reference ratio, and the preset maximum reference voltage is not counted down yet, the counter counts down the preset maximum reference voltage.

9. The power converter according to claim 8, wherein, each time when the current detector circuit determines that the ratio of the current currently flowing through each of the plurality of switch components with respect to the current initially flowing through each of the plurality of switch components is smaller than the reference ratio, and the preset maximum reference voltage is counted down to form the reference voltage, the counter counts down the reference voltage.

10. The power converter according to claim 9, wherein, when the current detector circuit determines that the ratio of the current currently flowing through each of the plurality of switch components with respect to the current initially flowing through each of the plurality of switch components is larger than the reference ratio, the counter counts up the reference voltage instead of counting down the reference voltage.

11. The power converter according to claim 8, wherein, when the counter determines that all of the plurality of the switch components operate in a saturation region according to the value of the current flowing through each of the switch components from the current detector circuit, the counter counts down the reference voltage.

12. The power converter according to claim 11, wherein, when the counter determines that any one of the plurality of the switch components operates in a linear region according to the value of the current flowing through the one of the switch components from the current detector circuit, the counter counts up the reference voltage.

13. The power converter according to claim 1, wherein, each time when the counter counts down the reference voltage, the counter counts down the reference voltage N times to subtract N preset modulation voltages from the reference voltage, wherein N is a positive integer value;

wherein, each time when the counter counts up the reference voltage, the counter counts up the reference voltage M times to add M preset modulation voltages to the reference voltage, wherein M is a positive integer value.

14. The power converter according to claim 1, wherein the plurality of electronic components controlled by the power converter include a plurality of light-emitting components.

\* \* \* \* \*